United States Patent
Kleine et al.

Patent Number: 6,089,337
Date of Patent: Jul. 18, 2000

[54] DRILLING AND/OR CHISELING TOOL

[75] Inventors: Werner Kleine, Achim; Hans-Werner Bongers-Ambrosius, Munich, both of Germany

[73] Assignee: Hilti Aktiengesellschaft, Schaan, Liechtenstein

[21] Appl. No.: 09/012,632

[22] Filed: Jan. 23, 1998

[30] Foreign Application Priority Data

Feb. 22, 1997 [DE] Germany .......................... 197 07 115

[51] Int. Cl.$^7$ .................................. E21B 10/44
[52] U.S. Cl. ............. 175/394; 175/323; 175/420.1; 408/230
[58] Field of Search ................... 175/394, 395, 175/420.1, 323, 320; 408/230

[56] References Cited

U.S. PATENT DOCUMENTS

| | | | |
|---|---|---|---|
| 4,579,180 | 4/1986 | Peetz et al. | 175/395 |
| 4,967,855 | 11/1990 | Moser | 175/323 |
| 5,553,682 | 9/1996 | Batliner et al. | 175/395 |
| 5,641,028 | 6/1997 | Resendez et al. | 175/394 |

FOREIGN PATENT DOCUMENTS

| | | |
|---|---|---|
| 700092 | 8/1997 | European Pat. Off. . |
| 2124857 | 9/1972 | France . |
| 66807 | 12/1982 | France . |
| 155216 | 9/1985 | France . |
| 4012772 | 10/1991 | Germany . |
| 9319009 | 2/1994 | Germany . |

OTHER PUBLICATIONS

Patent Abstract of Japan No. 59 007511.

*Primary Examiner*—William Neuder
*Attorney, Agent, or Firm*—Brown & Wood, LLP

[57] ABSTRACT

A drilling and/or chiseling tool is formed basically by a shaping without cutting procedure and has a axially extending shaft (1) with at least three helical drilled material removal grooves (2). The shaft (1) has a shank (3) at its trailing end in the drilling direction, and at the opposite end, leading in the drilling direction is a drilling head (6). The drilling head (6) has a recess for holding a hard metal insert (8). Because of the number of removal grooves (2), the course of the grooves is approximately parallel to the shaft axis, whereby in the drilling head (6) region there is adequate material for laterally supporting the hard metal insert (8). Accordingly, an expensive correction of the shape of the removal grooves (2) in the region of the drilling head (6) can be avoided.

6 Claims, 2 Drawing Sheets

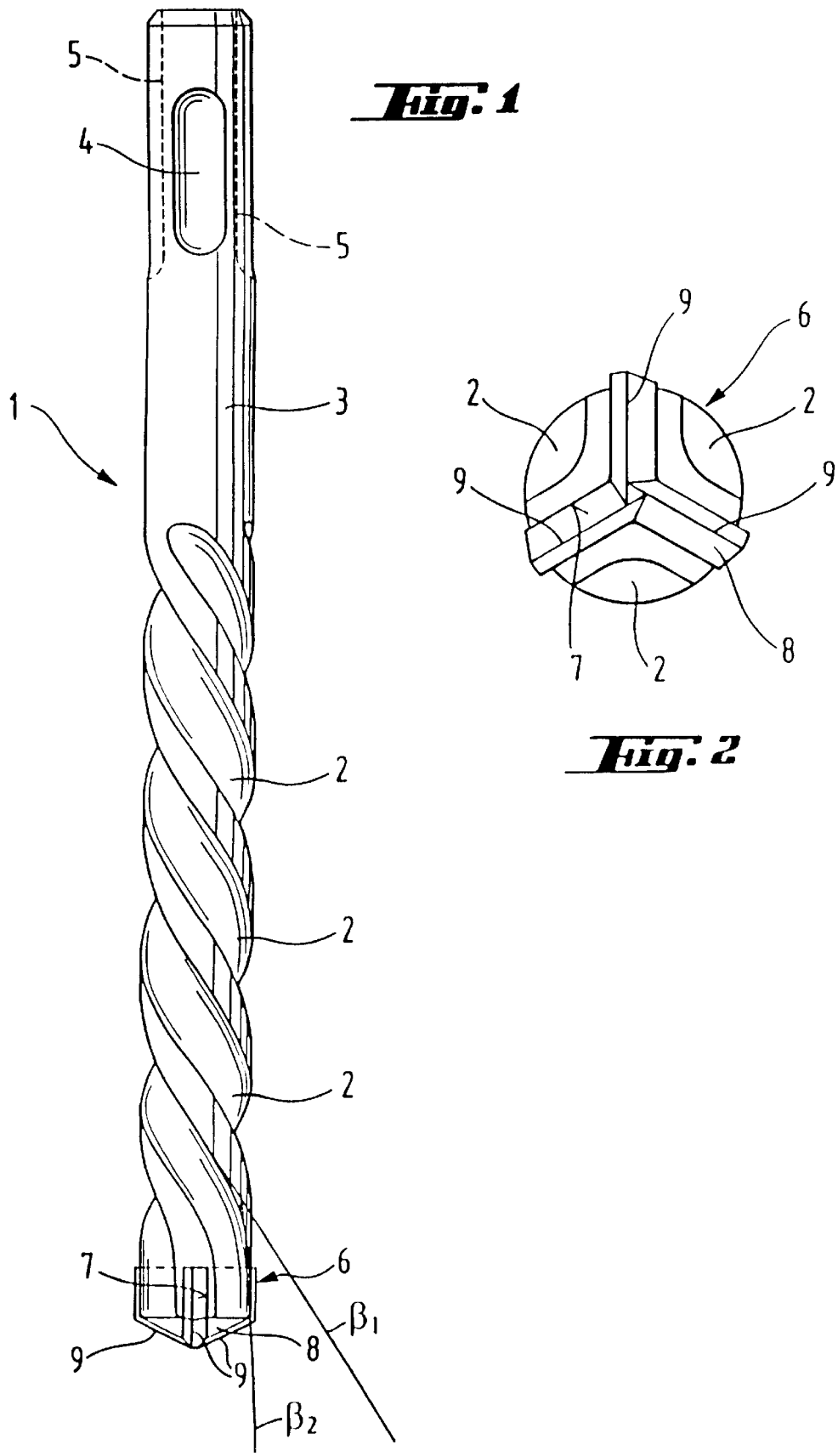

DRILLING AND/OR CHISELING TOOL

BACKGROUND OF THE INVENTION

The present invention is directed to a drilling and/or chiseling tool formed basically by shaping without cutting and includes an axially extending shaft having a leading end and a trailing end in the drilling direction. A shank is located at the trailing end and a drilling head with one or more hard metal inserts is located at the leading end. The shaft has helical drilled material removal grooves extending from the drilling head towards the shank with the hard metal inserts being secured in a recess at the leading end of the drilling end.

Tools of the above-mentioned type are used for working in rock, concrete, masonry and similar hard materials. At the trailing end of such tools, shanks are arranged for engagement in driving or drilling devices. A shaft with helical drilled material removal grooves extends axially from the shank in the drilling direction. A drilling head, with a recess open in the drilling direction is arranged for receiving one or more hard metal inserts. Since the hard metal inserts are arranged in a recess of the drilling head, they are supported on their sides by the drilling head. This has an advantageous effect on the connection between the hard metal inserts and the drilling head. Moreover, the hard metal inserts are supported over a large area by regions of the drilling head. This factor affords the strength to resist harmful effects arising out of the torque and the impacts applied at the drilling head.

The drilled material removal grooves in the shaft serve for carrying the drilled material or drillings developed as the tool is worked. To insure that the drillings are transported without interference from the drilling head into the removal grooves extending opposite to the drilling direction, an appropriate transition region must be provided in the drilling head. This transition region is present in the running out or end region of the removal grooves in the drilling direction. To assure that the hard metal inserts are still adequately supported by the drilling head in spite of the running out of the removal grooves, it must be insured that the running out of the grooves extends parallel to the shaft axis in the leading end region of the tool.

Due to the helical arrangement of the removal grooves, there is a relatively large deviation from the course of the running out sections parallel to the axis for conventional tools with one or two removal grooves. When such removal grooves extend into the drilling head without a sufficient correction regarding their slope, there may be inadequate support for the hard metal inserts. Accordingly, the tools presently in use employ a special design in the region of the drilling head where the removal grooves are arranged extending essentially parallel to the axis of the tool.

The above-mentioned necessary correction of the removal grooves leads to additional manufacturing expense resulting in a negative economical effect on the manufacturing procedure. As an example, if the removal grooves are formed by machine, a special control of the machine tools is required leading to an additional expenditure for equipment as well as an additional expenditure of time.

In place of machining, non-cutting procedures, such as shaping without cutting, is used at the present time for economic reasons. It is important that the bulk of the processing takes place by shaping without cutting and that certain steps in the procedure, such as the production of recesses for the hard metal inserts or a possible slight correction of the removal grooves, for example, in the running out region, can be effected by machine. For such economically significant shaping without cutting, the formation of the running out of the removal grooves at the drilling end of the tool essentially parallel to the tool axis also involves additional expense. Accordingly, a special additional rolling procedure is required for shaping the discharging grooves without any cutting, for example, by rolling, and this results in additional expense for equipment and an additional expenditure of time.

To avoid such additional expenditures where tools are formed by shaping without cutting, it has been known to weld the drilling head, consisting completely of hard metal, onto the shaft provided with removal grooves, instead of using hard metal inserts in appropriate recesses. Since such drilling heads, formed of hard metal, do not require any lateral support, separate processing of the drilling end of the shaft can be omitted.

SUMMARY OF THE INVENTION

Therefore, it is the primary object of the present invention to provide a drilling and/or chiseling tool with removal grooves formed mainly by shaping without cutting, and with hard metal inserts inserted into recesses in the drilling head so that the tool does not require any uneconomical, special treatment in the region of the drilling head.

In accordance with the present invention, this object is accomplished by providing the drilling and/or chiseling tool produced by shaping without cutting, with at least three removal grooves.

This inventive solution is based on the assumption that, as the number of grooves increases, the drilled material removal grooves are steeper, that is, they come closer to being parallel to the axis of the shaft. It turns out, when there are three removal grooves, their course is so close to being parallel to the axis, that there is sufficient lateral support in the drilling head for the hard metal inserts, even if the running out the grooves is not corrected or not corrected to a significant degree. Accordingly, tools with at least three drilled material removal grooves and formed by shaping without cutting, need not be subjected to any costly treatment in the region of the drilling head. As a result, providing at least three drilled material removal grooves leads to a manufacturing process which is extremely interesting economically.

Furthermore, it may not be overlooked that a tool with a larger number of removal grooves leads to significant manufacturing advantages. For example, when there are only one or two removal grooves in the axial direction, a relatively large flow of material is required to make available an adequate volume for discharging the drillings or drilled material. When at least three discharging grooves are provided, such volume is distributed over all the grooves so that the flow of material which must be handled is significantly less. As a result, when at least three removal grooves are produced during the manufacturing process by shaping without cutting, so little of the material is shaped that internal stresses tending to cause damage, are avoided.

For tools of smaller diameter, three removal grooves are advantageous from the point of view of the arrangement of the number of removal grooves, as well as with respect to the material shaping without cutting that must be undertaken.

For tools of larger diameter, four removal grooves are advantageous again from the point of view of material shaping without cutting which must be undertaken.

Depending on the intended use of the tools embodying the present invention, as well as on the number of removal grooves, the pitch angle of the removal grooves in the region of the running out of the grooves in the drilling head corresponds advantageously to the pitch angle of the grooves in the shaft.

Alternatively, the pitch angle of the removal grooves can deviate in the running out region in the drilling head from the pitch angle of the removal grooves in the shaft with such a deviation occurring advantageously due to a larger pitch angle in the region of the drilling head. Such a deviation in the pitch angle can lead to an improvement in the transport or removal of the drillings in the region of the drilling head. The deviation of the pitch angle requires a slope correction in the region of the drilling head. In tools embodying the present invention, such correction is so slight, whereby the economic advantages of the manufacturing procedure continues to be assured. The correction can be made with or without cutting.

A variety of different known shaping without cutting methods are available, such as rotary kneading, forging or twist rolling for producing the tool. With regard to economic efficiency as well as with respect to the cycle times for the manufacturing procedure, cold rolling of the profile or shape and in particular roll cold rolling of the profile has proven its value.

As mentioned above, the drilling heads are provided with a recess open in the drilling direction in which one or more hard metal inserts are secured. Such recesses can be formed in a variety of ways. Preferably, however, they are arranged in the end face of the drilling head extending over its entire diameter. As an example, star-shaped or cross-shaped recesses can extend in a slot fashion along a diameter. In addition to securing several hard metal inserts in such recesses, a single hard metal insert can be used advantageously. Depending on the arrangement of the recess, such a single hard metal insert can be formed as a plate, a star, a cross or the like.

With regard to the design of the drilling head and the hard metal insert, it is advisable if the hard metal insert has a number of cutting edges corresponding to the number of removal grooves. For example, when there are three removal grooves, the hard metal insert can be formed in a star shape in one piece with three cutting edges and a centering tip.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

BRIEF DESCRIPTION OF THE DRAWING

FIG. 1 is an axially extending side view of a tool embodying the present invention;

FIG. 2 is a plan view of the drilling head of the tool as shown in FIG. 1;

DETAILED DESCRIPTION OF THE INVENTION

Figure 3:
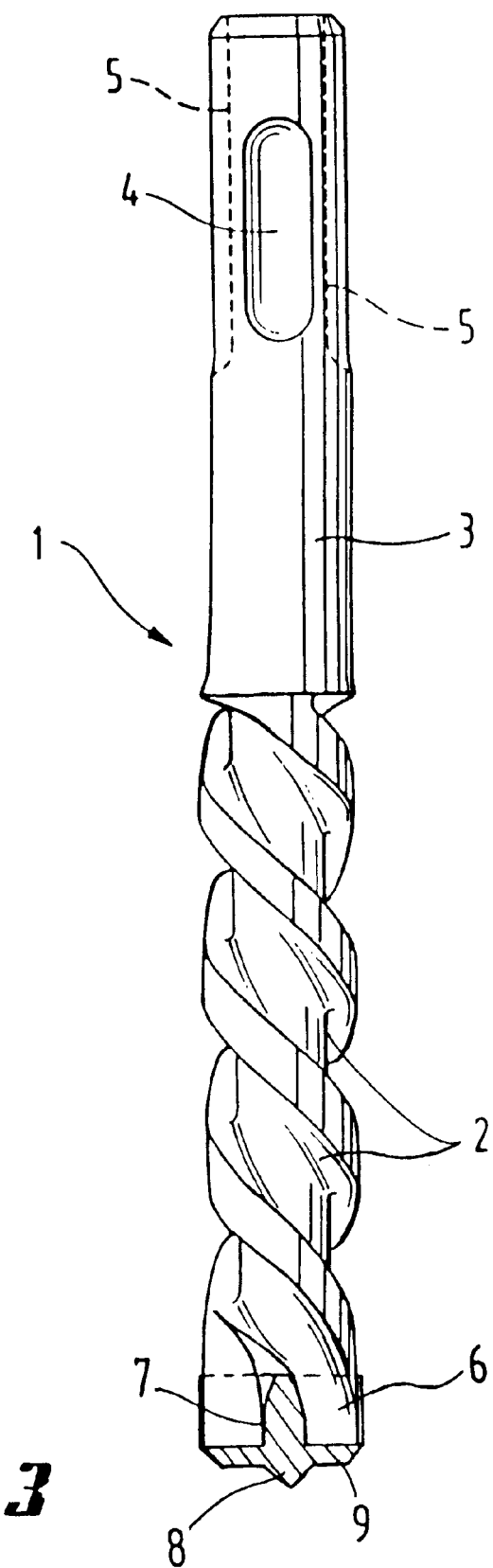
FIG. 3 is an axially, extending side view, similar to FIG. 1 of another embodiment of the present invention.

An axially extending tool, as shown in FIGS. 1 and 2, is formed as a drilling tool and has an axially extending shaft 1 with three helical drilled material removal grooves 2. The shaft 1 has a leading end in the drilling direction, the lower end in FIG. 1, and a trailing end, the upper end in FIG. 1. A shank 3 extending in the axial direction of the tool extends from the trailing end of the shaft 1 and is provided in a known manner with locking grooves 4 and rotational driving grooves 5. At the leading end of the shaft 1 there is a drilling head 6 with a recess 7 open in the drilling direction. A hard metal insert 8 formed as a single piece and having a cutting edge 9, is located in the recess 7. As shown in FIG. 2, the hard metal insert 8 is provided with three generally radially extending cutting edges 9 spaced angularly apart. As a result, the recess 7 has a star shape corresponding to the arrangement to the cutting edges 9 on the insert 8.

In FIG. 1 the removal grooves 2 between the shank 3 and the drilling head have the same pitch angle and the same axial dimension between the lands separating the grooves. The shape of the removal grooves is the same from the shank to the drilling head 6.

The drilling tool, illustrated in FIGS. 1 and 2, has been formed mainly by shaping without cutting, for example by cold rolling of its shape or profile. In particular, FIG. 1 shows how the drilled material removal grooves 2, because of their number, extend relatively steeply along the shaft. Accordingly, the running out of the removal grooves 2 is also relatively steep in the region of the drilling head, that is, it closely approximates a course parallel to the tool axis. As can be noted in FIG. 1, the running out of the removal grooves 2 in the drilling head 6 undergoes a slight slope correction and moves closer to being parallel to the axis of the shaft. Note the pitch angle $\beta_1$ of the removal groove 6 between the shank and the drilling head and the pitch angle $\beta_2$ in the running out region in the drilling head. Due to this course of the removal grooves 2, there are adequate passages for the drillings or drilled material in the region of the drilling head 6. In addition, sufficient material remains in the drilling head for supporting the hard metal insert 8 as can be noted particularly in FIG. 2. Accordingly, FIGS. 1 and 2 display a drilling tool with removal grooves 2 which in the region of the drilling head do not require any uneconomical treatment with respect to a course correction, so that the tool can be manufactured in a cold rolling system.

In FIG. 3 the removal grooves 2 have a pitch angle relative to the axis of the shaft 1 and the pitch angle in the running out region of the removal grooves 2 corresponds substantially to the pitch angle of the grooves in the shaft.

We claim:

1. A drilling and/or chiseling tool comprises an axially extending shaft (1) having a first end leading in the drilling direction and an opposite second end, a shank (3) extends axially from the second end of said shaft (1), a drilling head (6) is formed integrally with said shaft (1) and extends axially therewith at the first end of said shaft (1) and has at least one hard metal insert (8) secured therein, said shaft (1) having helical drilled material removal grooves (2) extending between said drilling head (6) and said shank (3), said hard metal insert (8) secured in a recess (7) in a surface of said drilling head facing in the drilling direction, said hard metal insert has at least three generally radially extending cutting edges (9) with said cutting edges spaced angularly apart and at least three said removal grooves formed in said shaft (1), said removal grooves have the same uniform pitch angle and a same uniform axial spacing between the shank (3) and the drilling head (6) with the removal grooves forming a running out region extending through the drilling head to the first end of said shaft, and said cutting edges (9) each located between a pair of adjacent running out regions of said removal grooves located in said drilling head (6).

2. A drilling and/or chiseling tool, as set forth in claim 1, wherein three said removal grooves (3) are formed in said shaft.

3. A drilling and/or chiseling tool, as set forth in claim 1, wherein four said removal grooves (2) are formed in said shaft.

4. A drilling and/or chiseling tool, as set forth in claims 1, 2 or 3, wherein said removal grooves (2) have the pitch angle in the running out region of said grooves in said drilling head (6) corresponding substantially to the pitch angle of said removal grooves (2) in said shaft (1) between the shank and the drilling head.

5. A drilling and/or chiseling tool, as set forth in claims 1, 2 or 3, wherein said removal grooves (2) have the pitch angle $\beta_1$ relative to the axis of the shaft (1) and said grooves in the running out region in said drilling head (6) have a pitch angle $\beta_2$ deviating from the pitch angle of the removal grooves (2) between the shank and the drilling tool in said shaft (1) and the pitch angle in the running out region approaches the axis of said shaft.

6. A drilling and/or chiseling tool, as set forth in claims 1, 2 or 3, wherein said hard metal insert (8) is a single piece insert (8) secured in said drilling head (6).

* * * * *